Figure 1:
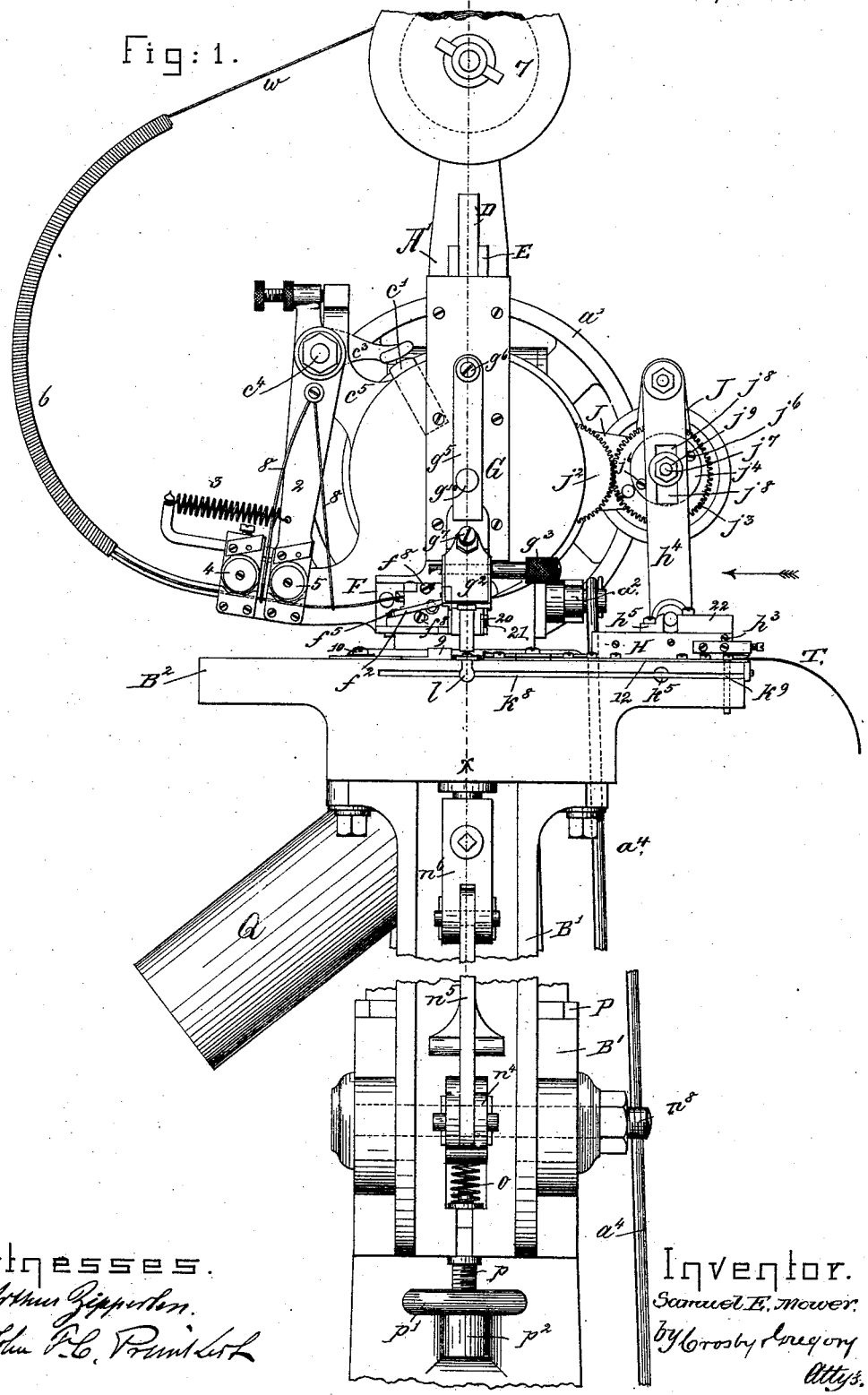

(No Model.) 6 Sheets—Sheet 1.
S. E. MOWER.
MACHINE FOR MANUFACTURING PIN TAGS.

No. 352,254. Patented Nov. 9, 1886.

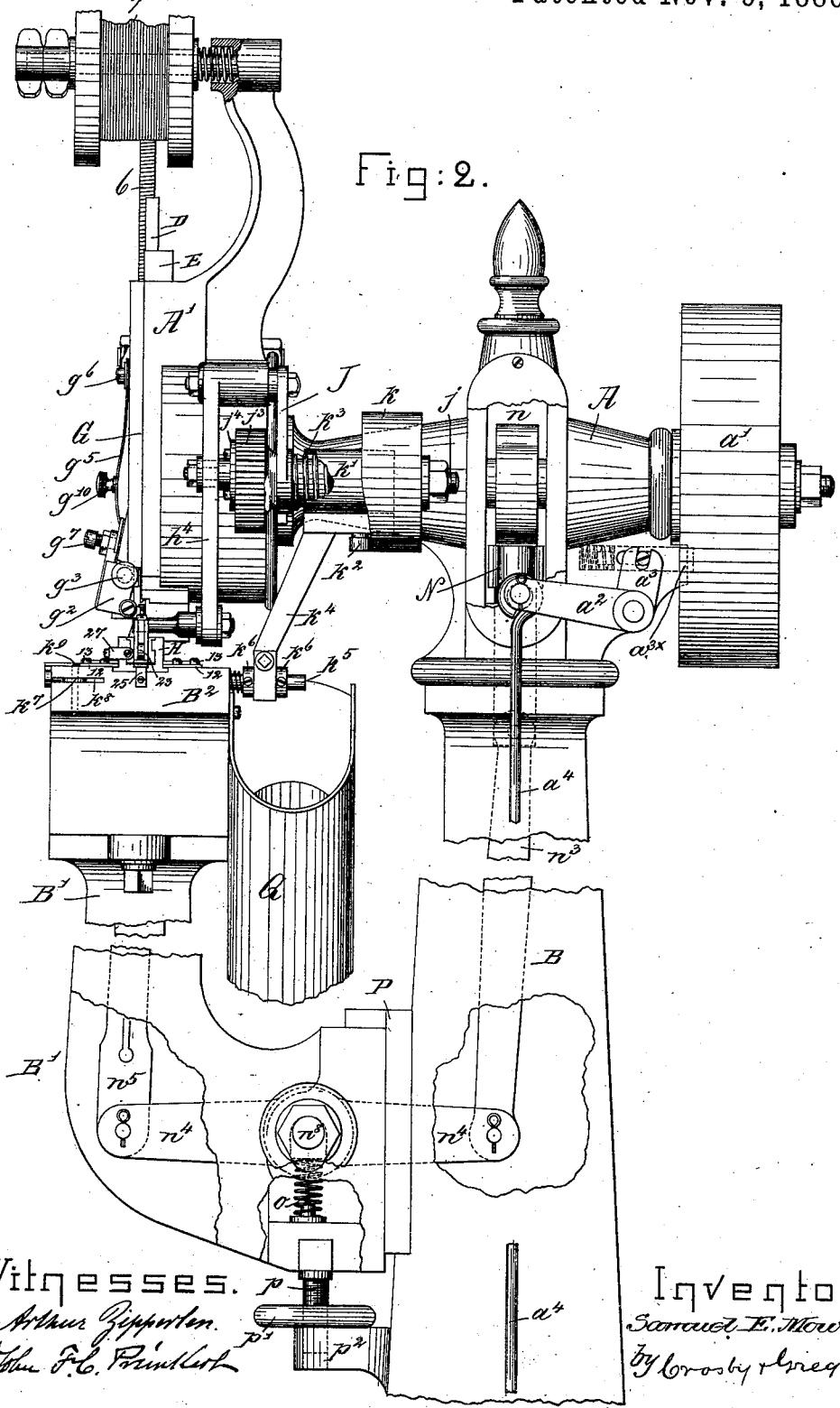

(No Model.) 6 Sheets—Sheet 3.
S. E. MOWER.
MACHINE FOR MANUFACTURING PIN TAGS.
No. 352,254. Patented Nov. 9, 1886.
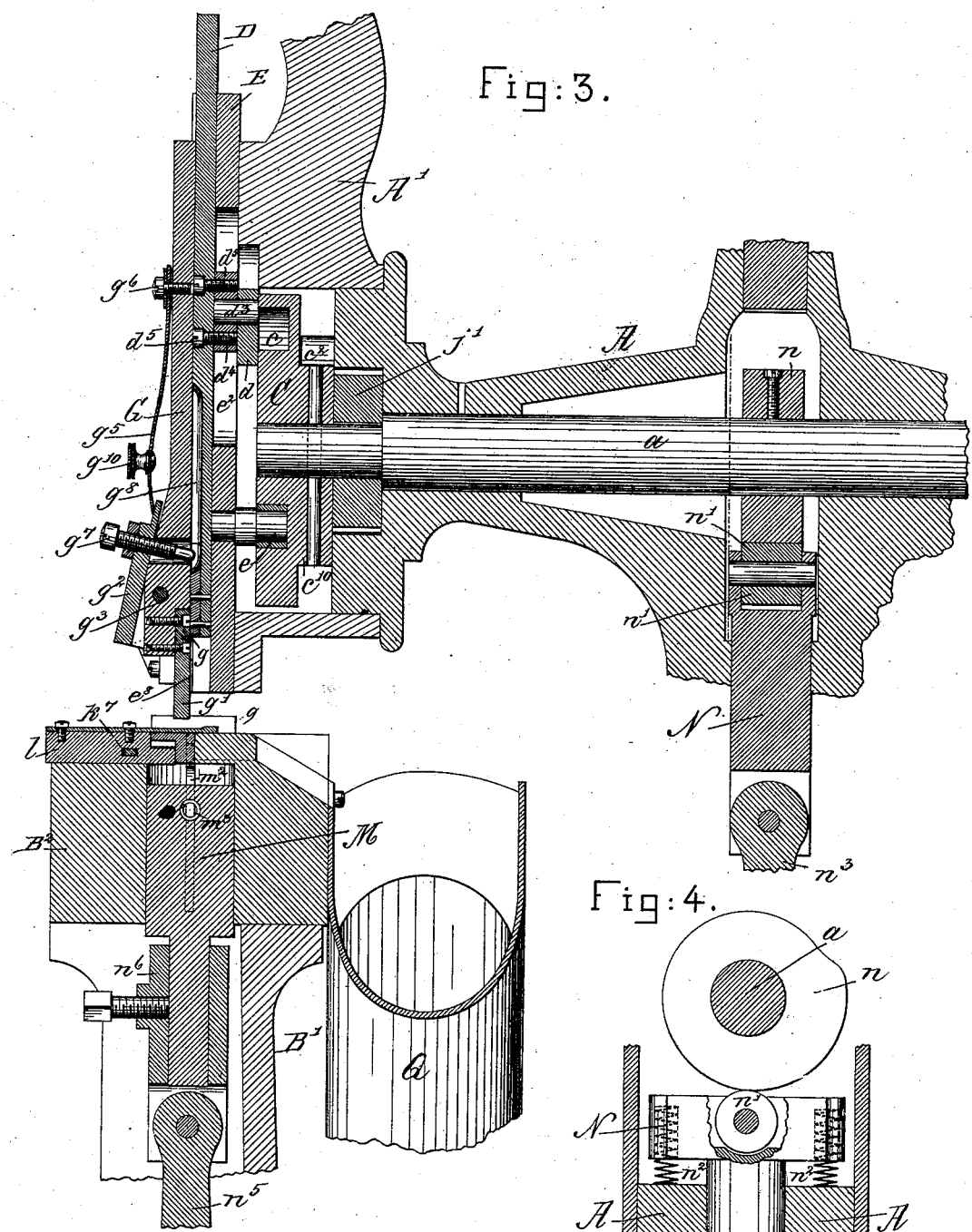
Witnesses.
Arthur Zipperlen
John F. C. Priesterk
Inventor.
Samuel E. Mower
by Crosby & Gregory
Attys

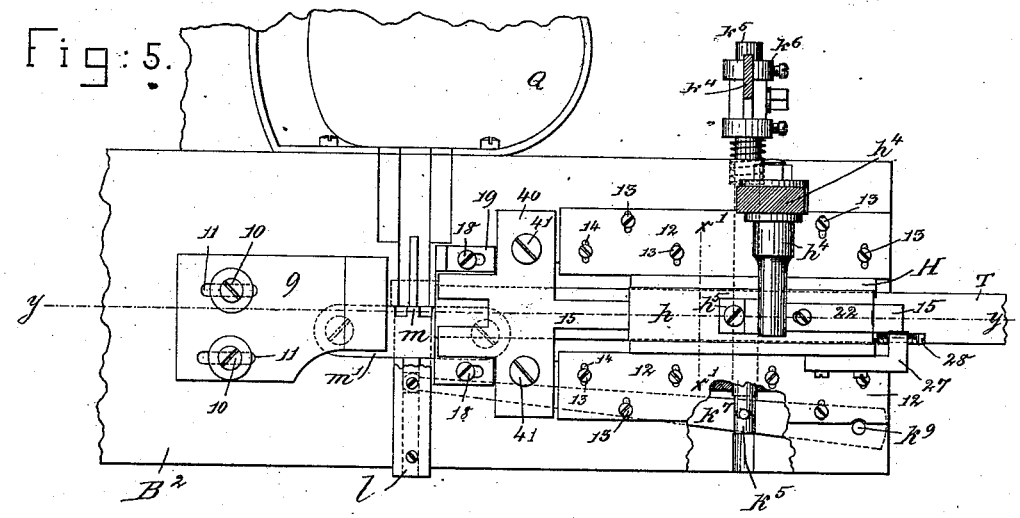

(No Model.) 6 Sheets—Sheet 5.
S. E. MOWER.
MACHINE FOR MANUFACTURING PIN TAGS.
No. 352,254. Patented Nov. 9, 1886.
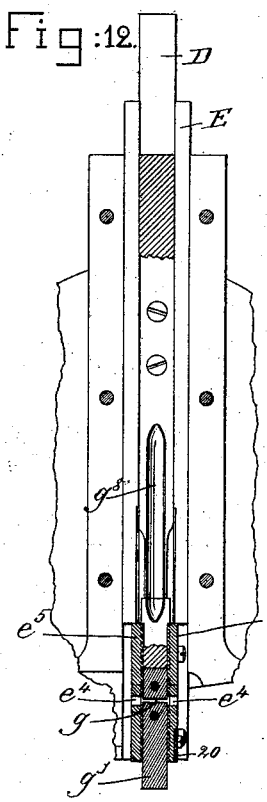
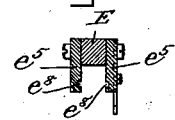
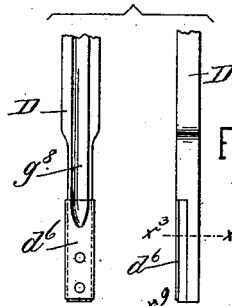
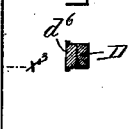
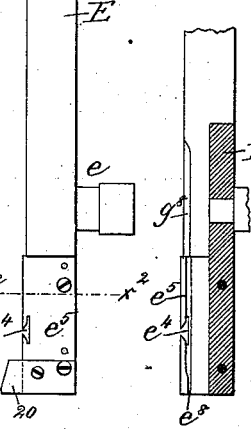
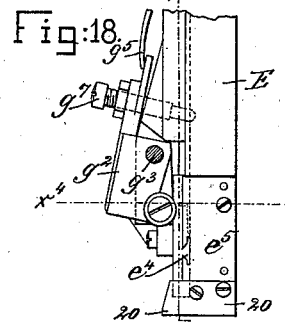
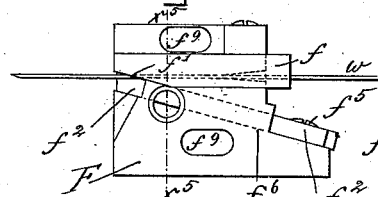
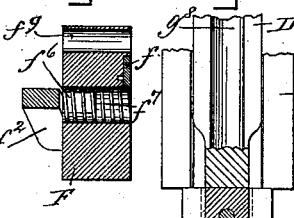
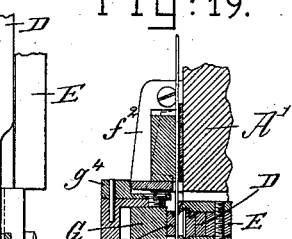
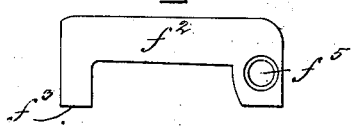
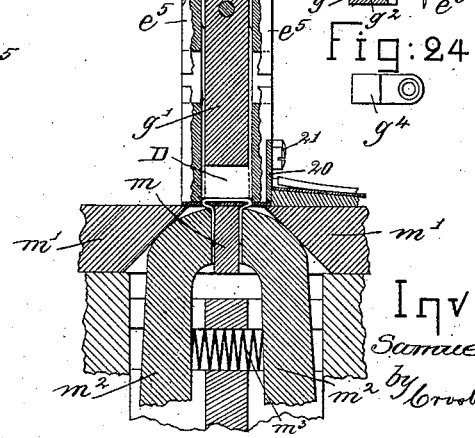
Witnesses.
Arthur Zipperlen.
John F. C. Prinkert.
Inventor.
Samuel E. Mower,
by Crosby Gregory
Atty.

(No Model.) 6 Sheets—Sheet 6.
S. E. MOWER.
MACHINE FOR MANUFACTURING PIN TAGS.
No. 352,254. Patented Nov. 9, 1886.
Fig: 25.
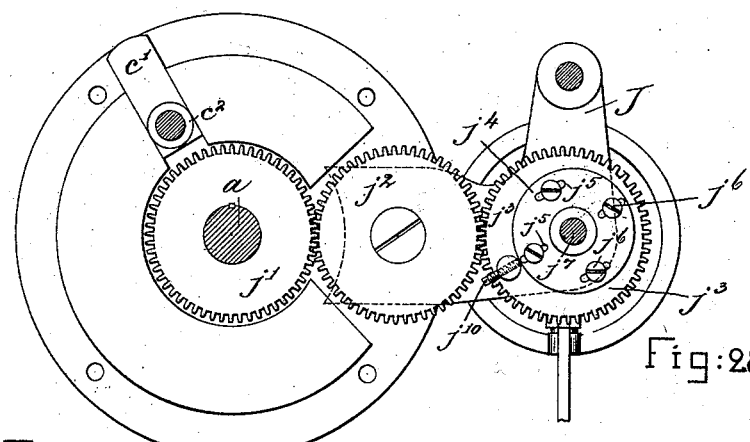
Fig: 26.
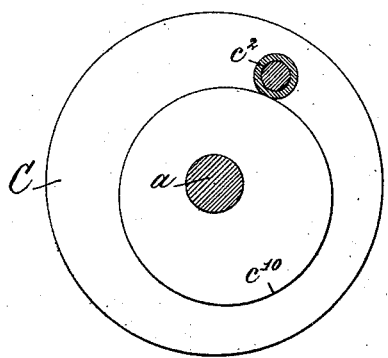
Fig: 27.
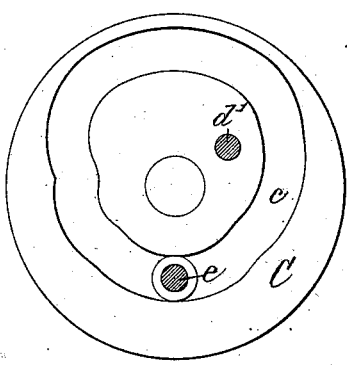
Fig: 28.
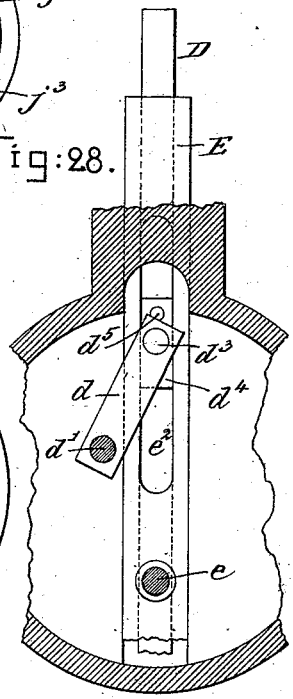
Fig: 29.
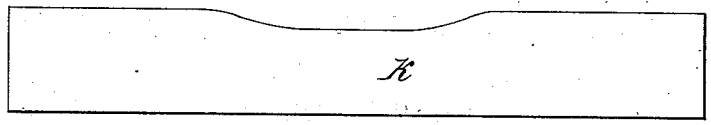
Fig: 30.
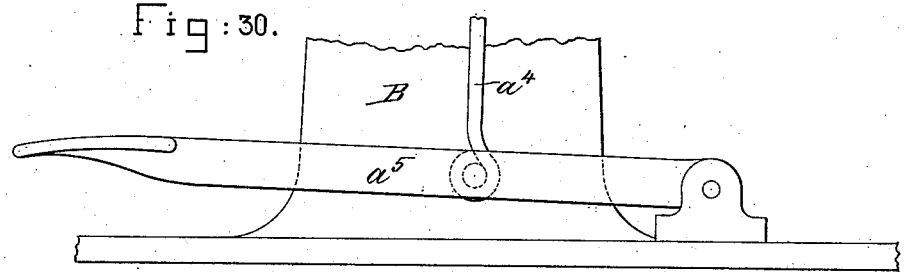
Witnesses.
Arthur Pipperton.
John F. C. Printeth.
Inventor.
Samuel E. Mower.
by Crosby Gregory
Attys.

UNITED STATES PATENT OFFICE.

SAMUEL E. MOWER, OF NEW HAVEN, ASSIGNOR TO HENRY G. THOMPSON, OF MILFORD, AND H. GRANT THOMPSON, OF NEW HAVEN, CONN.

MACHINE FOR MANUFACTURING PIN-TAGS.

SPECIFICATION forming part of Letters Patent No. 352,254, dated November 9, 1886.

Application filed December 19, 1885. Serial No. 186,241. (No model.)

*To all whom it may concern:*

Be it known that I, SAMUEL E. MOWER, of New Haven, county of New Haven, and State of Connecticut, have invented an Improvement in Machine for Manufacturing Pin-Tags, of which the following description, in connection with the accompanying drawings, is a specification, like letters on the drawings representing like parts.

My invention relates to machines for attaching pins or staples to tags to form what is commonly known as "pin-tags" or "pin-tickets," my improved machine being more especially designed for making the pin-tags shown and described in Letters Patent granted to me on the 17th day of March, 1885, and numbered 313,948, wherein the pin-staple is clinched and partly folded against the under side of the tag to prevent disengagement of one from the other.

In this my machine I employ a continuous tag-strip, which is automatically fed to the machine, and the tags are severed one by one from the said strip as the staples, made in the machine, are driven therein, such method of operation enabling the production of better work, and in greater quantity and at the minimum of cost.

In this my improved machine, besides the use of wire feeding and cutting mechanism in connection with staple forming and driving mechanism, I employ tag-strip-feeding mechanism, tag-severing mechanism, and means to clinch or partially fold the pin or staple against the under side of the tag, so as to bind the tag and pin to each other. Furthermore, the tag-strip-feeding mechanism and tag-strip are made adjustable to attain variable feed for said strip, whereby tags of different sizes may be easily and readily fed to the staple forming and driving mechanism in such manner that said staples will be attached to the center of the tag, whatever may be the feed of the tag-strip.

Figure 1 shows in front elevation a machine embodying my invention for making pin-tags, the lower part of the standard being shown as broken out to save space on the drawings. Fig. 2 is a right-side elevation, partially broken out, looking in the direction of the arrow, Fig. 1. Fig. 3 is a partial central vertical section on the line $x$ $x$, Fig. 1. Fig. 4 shows in detail the cam-wheel and roll which operate the pin-clinching mechanism. Fig. 5 is a plan view of the clincher bed-plate, with tag-strip-feed mechanism and part of the discharge-chute; Fig. 6, a sectional view thereof on line $y$ $y$ of Fig. 5, showing the pin-clincher mechanism more in detail; Fig. 7, a detail of part of the tag-feed mechanism on line $x'$ $x'$, Fig. 5; Fig. 8, a detail in elevation of the tag-strip feed; Fig. 9, detail views of the bottom or beveled tag-strip knife; Fig. 10, an elevation of the pin-tag so made by this my improved machine; Fig. 11, a plan view thereof. Fig. 12 is a front elevation, partly in section, of the driver and former bars and the box or case therefor; Fig. 13, a side view of the former-bar; Fig. 14, a transverse section of the former-bar on line $x^2$ $x^2$, Fig. 13. Fig. 15 is a partial front and side elevation of the driver-bar; Fig. 16, a cross-section of the driver-bar on line $x^3$ $x^3$, Fig. 15; Fig. 17, a partial central longitudinal section of the former-bar which is shown in Fig. 13; Fig. 18, a detail in side elevation, partly broken away, showing the lower portions of the former-bar, also the block or rocker which operates the movable pin-cutting knife, and which forces the cut pin into the grasp of the former-bar; Fig. 19, a section thereof on line $x^4$ $x^4$, Fig. 18. Fig. 20 is a rear elevation of the wire-cutter which carries the cutting-knives; Fig. 21, a section on line $x^5$ $x^5$ of Fig. 20, to show the socket and coiled spring therein, which latter throws the movable knife outward from the wire-cutter. Fig. 22 is a plan of the movable pin-staple cutting-knife; Fig. 23, a detail elevation, partly in section, in the line $x^9$, Fig. 18, of the former and driver bars, the clincher mechanism, and certain accompanying mechanism to be referred to. Fig. 24 is a detail elevation of a block which is secured to the rocker to engage the movable pin-cutting knife and cause its inward throw to sever the pin from the wire; Fig. 25, a detail in elevation of the gears which operate the tag-strip feed and "knock-off" or clearer mechanism. Fig. 26 is a rear elevation of the cam-disk with cam-hub, showing in contact therewith the roll which is attached to and operates the feed-actuating slide that sets the wire-feed mechanism into operation. Fig. 27 is a front elevation of the cam-disk. Fig. 28 is a detail showing part of the case and the former and driver bars, the latter having a link which is attached to a pin on the cam-disk. Fig. 29 shows, flattened out, the peripheries or cam portion of the cam-wheel which operates the tag-clearer mechanism. Fig. 30 is a detail elevation of the bottom portion of the standard which is broken away from Fig. 1, with an attached foot which operates the clutch that engages and disengages the belt-pulley and main driving-shaft.

The main frame A of the machine, supported upon a column, B, as herein shown, contains a main shaft, $a$, which is provided with a usual loose pulley, $a'$, and clutch parts $a^2$ $a^3$, connected by rod $a^4$ with foot-lever $a^5$, (see Fig. 30,) so that the said main shaft may be rotated or not with the pulley, as is usual in staple-forming machines now commonly in use. The forward end of the main shaft $a$ is provided with a cam-disk, C, of substantially the construction and operation of the like disk shown and described in Letters Patent No. 309,081, to which reference is made for a more detailed description thereof. The cam-disk C as in said patent operates the driver-bar D and the former E. The driver-bar D is connected to the said cam-disk by means of the link $d$, (see Figs. 3 and 28,) attached to the pin $d'$ in the face of the said cam-disk. (See Figs. 27 and 28.) The former E is operatively connected therewith by the roller-stud $e$, working in the cam-groove $c$ of the disk C, as shown in Figs. 3 and 27. The cam-disk imparts reciprocating motion to the driver-bar D and to the former E. The back of the cam-disk C has a cam-hub, $c^{10}$, to actuate the feed-controlling slide $c'$, (see Figs. 1 and 25,) having at its inner end a suitable roll, $c^2$, (see Figs. 3 and 26,) which presses against the periphery of the said cam-hub, while at its upper or outer end the said slide is adapted to engage an arm, $c^3$, (see Fig. 1,) secured to the feed-actuating rock-shaft $c^4$, having bearings in the bracket $c^5$.

The wire-feed mechanism is identical with that shown and described in said Letters Patent No. 309,081, and consists, in general, of the arm 2, spring 3, the wire-grips 4 5, and grooved feed-rod 6, the wire coming from the spool 7, mounted on an extension of the head of the main frame.

In addition to the foregoing feed mechanism, I have provided in the present instance the two-part wire-support 8, attached to the arm 2 and arranged one part on each side of the wire-feed grip 5, as an additional support for the rather flexible wire, to prevent bending or buckling while being fed to the wire-cutter and staple-former.

The former E slides in a groove in the head A' of the main frame, and it has a slot, $e^2$, in its back (see Figs. 3 and 28) to permit the stud $d^3$ of the block $d^4$, attached by screws $d^5$ to the back of the driver-bar, which slides in the former E, to project at the back of said former and be fastened to the link $d$.

The wire-feed mechanism causes the wire $w$ to be fed through the wire-cutter F in a groove therein in front of the fixed knife or cutting member $f$, having the beveled portion $f'$, (see Fig. 20,) while the movable knife $f^2$, substantially of the form shown in Fig. 22, wherein $f^3$ is the cutting end or portion is pivoted by the pivot-screw $f^5$ to the wire-cutter F and moves in a groove, $f^6$, (shown in dotted lines, Fig. 20, and full lines Fig. 21,) in said block, so as to be moved past the beveled portion or cutting-edge $f'$ of the fixed knife, and thus cut the wire on a bevel or slant to provide a point therefor. The movable knife member $f^2$ is forced outward from the fixed member by means of a coiled spring, $f^7$, placed in a socket in the wire-cutter block, as shown in Fig. 21. The cutter-block F is attached to the lower part of the head A' by screws $f^8$, (see Fig. 1,) entering the slots $f^9$ (see Fig. 20) in the said block, the block being located near but to one side and slightly in front of the former E, with the cutting-edges of the cutting members next the said former. As the wire passes through and from the wire-cutter it enters a transverse groove, $g$, (see Fig. 3,) in the lower portion or projection $g'$ on the back of the face-plate G. A piece of wire of proper length to form the pin-staple, as shown in Fig. 10, is cut from the coil by the cutters through the operation of a cut-bar or rocker, $g^2$, which is pivoted to the face-plate G by means of the removable cut-bar pin $g^3$, the said cut-bar having a rocking motion on the face-plate, and being provided with a catch or projection, $g^4$, (see Figs. 19 and 24,) to engage the movable knife member $f^2$ and force it past the fixed knife member $f$ of the wire-cutter, to thus sever the wire. The lower end of the cut-bar or rocker $g^2$ is retained in normal or outward position by means of the flat spring $g^5$, secured at its upper end to the face-plate by a screw, $g^6$, and provided with a thumb-nut, $g^{10}$, to enable it to be swung to one side when it is desired to remove the cut-bar or rocker from the face-plate. The cut-bar is forced inward, as against the resistance of the spring $g^5$, to actuate the movable knife member by means of the upward movement of the driver-bar D, which latter forces the conical or rounded end of a screw, $g^7$, (see Fig. 3,) (secured to the cut-bar and projecting into a groove, $g^8$, of the driver-bar, the groove having a sloping top and bottom) out of said groove, thereby partially rotating the cut-bar $g^2$ on the cut-bar pin $g^3$, causing the lower end of said cut-bar to move inward toward the face-plate, compelling the catch $g^4$ to push against the movable knife $f^2$, as will be understood by inspection of Figs. 1 and 3. This inward movement of the lower end of the cut-bar $g^2$ causing the wire to be severed, also forces the severed piece of wire into transverse grooves $e^4$, that are formed in those portions of the plate $e^3$, secured to the sides of the former E, that project outward beyond the face of said former, the said severed piece of wire being still resting at its middle in the groove $g$ of the portion $g'$ of the face-plate, so that upon the downward movement of the former E the ends of the wire, or those portions thereof which are to form the prongs of the pin-staple (shown in Fig. 10) will be "wiped" or bent down, the sides of the removable portion $g'$ holding the middle of the short piece of wire, thereby forming the pin-staple, minus the folds which clasp the tag, the said folds being formed in the manner to be presently described. The pin staple thus far formed is forced, during the partial formation of a succeeding pin-staple by such succeeding pin-staple, out of the line of the grooves $e^4$ backward and into the line of the grooves $e^3$, one in each of the plates $e^5$, attached to the former E, the said grooves being directly in the path of movement of the driver-bar D, which at such time is immediately above the pin-staple when it is in position to be driven by the driver shown in Fig. 15. The driver-bar D has a plate, $d^6$, attached to its lower end, which projects slightly beyond its sides and enters the groove $e^8$, so as to fully engage the crown of the pin-staple when driving the same.

Supported upon the end of a supplemental column, B', which rises from the main column B, is the table $B^2$, provided with a stop, 9, for the tag-strip T, the said stop being adjustably secured to the table by means of the screws 10, entering the table through the slots 11 (see Fig. 5) in the tag-stop. The said table is further provided with a pair of plates or guides, 12, adjustably secured thereto by screws 13, entering slots in the plates, so that the said plates may be adjusted to bear with more or less friction against the sides of the tag-strip feed-slide H, which is adapted to slide between the said guide-plates, there being an intervening space to allow the former E and driver-bar D to descend to the table. The feed-slide carries a clamp-block, $h$, having inclined grooves $h'$ (see Fig. 8) in its sides, which grooves receive inclined guides $h^2$, secured by screws $h^3$ to the inner side walls of the feed-slide H, so that when said feed-slide is moved toward the tag-stop 9 by means of a pin on an oscillating lever, $h^4$, engaging a stud, $h^5$, secured by screw $h^6$ to the top of the clamp-block $h$, the said block will have a combined forward and downward motion to pinch or clamp the tag-strip T between the said block and the bottom plate of the feed-slide, whereby said tag-strip will be fed toward the tag-stop 9 in the forward motion of the feed-slide. The tag-strip, taken from a roll, (not shown,) is passed between two plates, 15 16, which are of less width than said strip, and which extend through the feed-slide between it and the clamp block $h$, the said plates being fastened at their forward or inner ends to the table by screws 41, entering lateral projections 40 thereof.

Beneath the upper plate, 15, at its forward or inner end, and a suitable distance from the tag-stop, the lower member, 19, of the tag-strip cutter is adjustably secured to the table by set-screws 18, (see Fig. 5,) passing through slots in the said member. This knife member is beveled, (see Fig. 9,) and, co-operating with the upper knife, 20, secured to the side of the former E by a set-screw, 21, severs, as by a shear cut, a tag from the tag-strip in the downward motion of the former E.

In the backward movement of the feed-slide H the oscillating lever $h^4$ acts on a movable stop, 22, pivoted on the clamp-block $h$ at $22^\times$, and having a roll, 23, (see Fig. 6,) which bears on the top plate, 15, and as it rolls over the surface of said plate it binds or clamps the tag-strip between the plates and prevents any possible backward slipping of said strip. The force with which the roll binds the tag-strip can be controlled by the adjusting-screw 24, which passes through a slot in the stop 22 and enters the clamp-block $h$. The roll 23 clamps the plates 15 and 16, with intermediate tag-strip, down upon a stationary plate, 25, secured by screw 26 (see Fig. 6) to the tube, instead of clamping said parts to the bottom of the movable feed-slide. This prevents any possible slipping of the tag-strip and secures the best results.

As shown in Fig. 5, the feed slide has an arm, 27, attached thereto, which is provided with a set-screw, 28, capable of acting against the clamp-block $h$, so as to limit the play of the latter in the feed-slide, and thus regulate the length of time, during each forward movement of said block, that pressure or pinch is exerted on the tag-strip. Since the greater the play of the clamp-block $h$ in the feed-slide, the movement of the oscillating lever $h^4$ is taken up to a greater extent in moving the clamp-block $h$ in the feed slide before said clamp-block begins to act or bind on the tag-strip.

The oscillating arm which operates the clamping-block of the feed-slide is pivoted in a bracket or extension, J, projecting laterally from the main frame, and provided with bearings to receive a shaft, $j$, arranged parallel with the main shaft $a$, and receiving motion therefrom through the gear $j'$, fast on said main shaft, the idle-gear $j^2$ on the bracket, and the gear $j^3$, fast on the shaft $j$. (See Fig. 25.) A disk, $j^4$, is adjustably secured to the gear $j^3$ on the shaft $j$ by means of screws $j^5$. The disk $j^4$ carries a crank pin. $j^7$, which enters and is retained in the slot $j^8$, (see Fig. 1,) by the nut $j^9$, whereby oscillating motion, which may be varied according to requirements, is given to said lever $h^4$ by the rotation of the shaft $j'$. Upon loosening the screws which secure the disk $j^4$ to the gear $j^3$, the said disk may be adjusted to suit by means of the small adjusting-screw $j^{10}$. (See Fig. 25.) A cam-wheel, $k$, having a cam surface like that shown in Fig. 29, is made fast on the shaft $j$, and the said shaft also receives a sleeve, $k'$, having a coiled spring, $k^3$, interposed between it and the shaft, and encircling the latter, to project or force a roll, $k^2$, attached to the sleeve against the edge of the cam-wheel $k$, and thus give to the sleeve a reciprocating motion on the said shaft $j$ to convey to the slide-rod $k^5$ (through the arm $k^4$, rigidly attached to said sleeve, and adjustably secured to the back end of the slide-rod $k^5$ by means of the collars $k^6$, having set-screws) a like reciprocating motion, the latter sliding in a transverse socket in the table $B^2$, (see Fig. 6,) and receiving at its front end a lever, $k^7$, pivoted thereto, which rests in a groove, $k^8$, in the front wall of said table, and is further pivoted to the table at $k^9$, and enters a socket (see Fig. 3) in the tag-clearer $l$, which reciprocates in a socket in the table in a plane parallel with that of the rod $k^5$. The tag-clearer $l$ reciprocates in the space between the tag-stop 9, and the beveled member 19 of the tag-cutter forces the pin-tag, when completed, to one side, and permits another one to be fed thereto by the tag-feed.

As a pin-staple formed by the former E is driven through a tag resting on the table between the stop 9 and knife member 19, the prongs or legs of said staple pass on either side of an anvil, $m$, forming part of the hardened plate $m'$, (see Fig. 6,) let into the table, the underside of said plate having beveled faces which slope toward the anvil, and against which abut the upper ends of a pair of clinchers or folders, $m^2$, which are pivoted in slots in the clincher-carrier M, and normally held apart therein by the coiled spring $m^3$, resting in a socket in said carrier. This carrier M has a reciprocating motion in the table B to cause the clinchers or folders $m^2$ to move over the beveled surfaces of the plate $m'$, and toward the anvil $m$, to bear against the prongs or legs of a staple, and during the completion of the stroke of the driver-bar D, to fold or clinch said legs against the under side of the tag and against the sides of the anvil to form the pin-tag shown in Fig. 10.

Reciprocating motion is given to the clincher-carrier from the main shaft $a$ by means of a cam-wheel, $n$, fast on said shaft, Fig. 3, a roll-carrier, N, having a roll, $n'$, held against the cam-wheel by the springs $n^2$, interposed between said roll-carrier and the main frame A, (see Fig. 4,) the connecting-rod $n^3$ extending down within the main column B, and connected at its lower end to the lever $n^4$, pivoted to the supplemental column at or near its junction with the main column; and, lastly, the connecting-rod $n^5$, attached to the other end of said lever and to a coupling, $n^6$, (see Figs. 1 and 3,) itself connected with the clincher-carrier M.

To prevent uncertain or variable action on the part of the clinchers by reason of backlash of the lever $n^4$ and connecting-rods $n^3$ $n^5$, I interpose a coiled spring, $o$, (see Fig. 2,) between the lever $n^4$ (below its pivotal point $n^8$) and the supplemental column B', while the supplemental column B' itself may be raised or lowered on the dovetail guide P by means of the screw $p$ and hand-wheel $p'$, the former resting in a socket in the bracket $p^2$, forming a part of the main column, as shown in Fig. 2.

Q is the discharge-chute, secured to the back of the table, and into which the completed pin-tags are projected by the tag-clearer $l$.

I claim—

1. The combination, substantially as described, of a wire-feed, a wire-cutter, a reciprocating staple-former, and a driver-bar and driver, with a tag-strip feed-slide, and a tag-cutter provided with a stationary and a movable cutting member, for the purpose set forth.

2. The combination, substantially as described, of a wire-feed, a wire-cutter, a reciprocating staple-former, and a driver-bar and driver, with a tag-strip feed mechanism, a tag-cutter having a stationary and a movable knife, a tag-stop, and a tag-clearer or knock-off, for the purpose set forth.

3. The combination, substantially as described, with a staple-former and a staple-driver, of a stationary anvil and a pair of clinchers or folders arranged below the anvil, as and for the purpose set forth.

4. The combination, substantially as described, with a staple-former and a reciprocating driver, of a tag-strip feed-slide provided with a movable block mounted on inclined ways in the feed-slide, and a lever engaging said block to move it in the feed-slide and to actuate the slide, as and for the purpose set forth.

5. In a machine for manufacturing pin-tags, the tag-strip feed-slide provided with inclined ways, and the clamp-block mounted in the ways, a stud secured to the clamp-block, combined with a block pivoted to the slide, and having a clamp-roll, and a reciprocating lever to engage first the stud and then the pivoted block, as and for the purpose set forth.

6. In a machine for manufacturing pin-tags, the tag-strip feed-slide having inclined ways, combined with a clamp-block adapted to slide on the ways, and an elbow-arm secured to the slide and provided with an adjusting-screw to engage the clamp-block and regulate its movement in the slide, as and for the purpose set forth.

7. The table provided with a stop and a tag-strip feed-slide, combined with a tag-cutter having a stationary knife secured to the table, and a movable knife, and with a reciprocating tag-clearer adapted to move between the stop and the stationary knife of the tag-cutter, for the purpose set forth.

8. The head A', provided with a wire-cutter having an opening for the passage of the wire, and having a stationary knife and a movable or pivoted knife, combined with the reciprocating driver-bar having a groove in its face, as specified, of the cut-bar pivoted to the face-plate and provided with a screw, $g^7$, and a catch, $g^4$, substantially as described.

9. The head A', provided with a wire-cutter having an opening for the passage of wire, a stationary knife, and a pivoted knife, combined with the reciprocating driver-bar having a groove in its face, the former having a transverse groove in its face, as specified, the face-plate having a transverse groove, $g$, and the cut-bar pivoted to the face-plate and provided with a screw, $g^7$, a catch, $g^4$, and a spring to throw the lower end of said cut-bar outward from the face-plate, as and for the purpose set forth.

10. The combination, with the clincher-carrier provided with a pair of clinchers pivoted thereto, and the main shaft provided with a cam-wheel, $n$, of the spring-actuated roller-carrier, the pivoted lever $n^4$, and connecting-rods and coupling, whereby motion from the main shaft is transmitted to the clincher-carrier, substantially as described.

11. The combination, with the main shaft provided with a gear, the bracket I, having an auxiliary shaft provided with a gear, and the idle-gear $j^2$, and a cam-wheel, of a spring and sleeve encircling said shaft, the sleeve having a roll, as specified, the arm $k^4$, the slide-rod $k^5$, the lever $k^7$, and connected tag-clearer, as and for the purpose set forth.

12. In a machine for manufacturing pin-tags, the table having the plates 15 16, and the plate 25, combined with the feed-slide and its contained clamp-block having the pivoted stop provided with the press-roll, substantially as described.

In testimony whereof I have signed my name to this specification in the presence of two subscribing witnesses.

SAMUEL E. MOWER.

Witnesses:
HENRY G. THOMPSON,
J. O. KERSING.